United States Patent
Austin et al.

[11] Patent Number: 5,899,305
[45] Date of Patent: May 4, 1999

[54] METHOD FOR FABRICATING BRAKE DISC

[75] Inventors: Vince Austin, Rochester Hills, Mich.; Glenn Kochan, Newport News, Va.

[73] Assignee: Varga Brakes, Inc., Troy, Mich.

[21] Appl. No.: 08/859,696

[22] Filed: May 21, 1997

[51] Int. Cl.⁶ .................................................. F16D 65/10
[52] U.S. Cl. ....................... 188/218 XL; 451/63; 29/434
[58] Field of Search ...................... 188/218 XL; 451/63, 451/290, 902; 29/434

[56] References Cited

U.S. PATENT DOCUMENTS

| | | | |
|---|---|---|---|
| 2,666,503 | 1/1954 | McCune | 188/218 XL |
| 2,753,032 | 7/1956 | Eason | 188/218 XL |
| 3,481,083 | 12/1969 | David et al. | 451/63 |
| 4,262,452 | 4/1981 | Lopez | 451/63 |
| 4,825,596 | 5/1989 | Kinner | 451/63 X |
| 5,056,266 | 10/1991 | Norris | 451/262 |
| 5,430,926 | 7/1995 | Hartford | 29/434 |

*Primary Examiner*—Peter M. Poon
*Attorney, Agent, or Firm*—Howard & Howard

[57] ABSTRACT

A method for fabricating a brake disc assembly comprising the steps of machining a radially extending gage surface (54) on the support flange (34) of an outer race (32) of a bearing assembly disposed around a hub (14) and inserting a fixture post (72) through a bore (22) in the hub (14). A pressure plate (74) presents tabs (90) simulating a vehicle wheel and is disposed in engagement with the base (26) of the brake disc with a washer/nut (78) over the pressure plate (74) to place the post (72) in tension against the bearing assembly to maintain a pre-load on the bearing assembly. The outer race (32) of the bearing assembly is clamped with the gage surface (54) drawn against a gage (84) to properly orient the outer race (32) about a fixed axis (A). Thereafter, the pressure plate (74) is engaged by a rotation member (86) which rotates about a floating axis (B). A resilient pad (68) is sandwiched between the pressure plate (74) and the rotating member (86) in a plane perpendicular to the rotation axis (B) as the rotating member (86) is urged against the pressure plate (74) to compress the resilient pad (68) between the rotating member (86) and the pressure plate (74). The braking surfaces (30) of the rotor (28) are machined (92) while the rotating member (86) rotates the hub (14) and brake disc relative to the outer race (32), which is held in a fixed position relative to the machining tools (92).

14 Claims, 5 Drawing Sheets

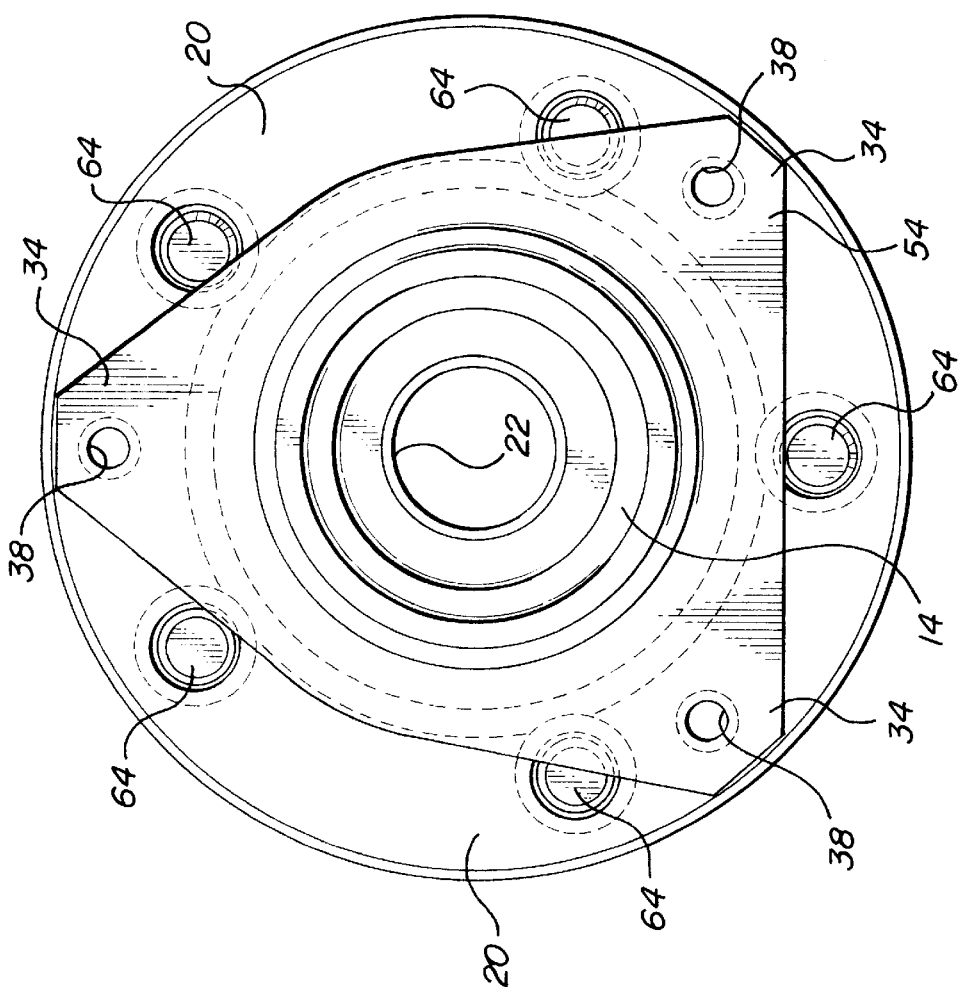
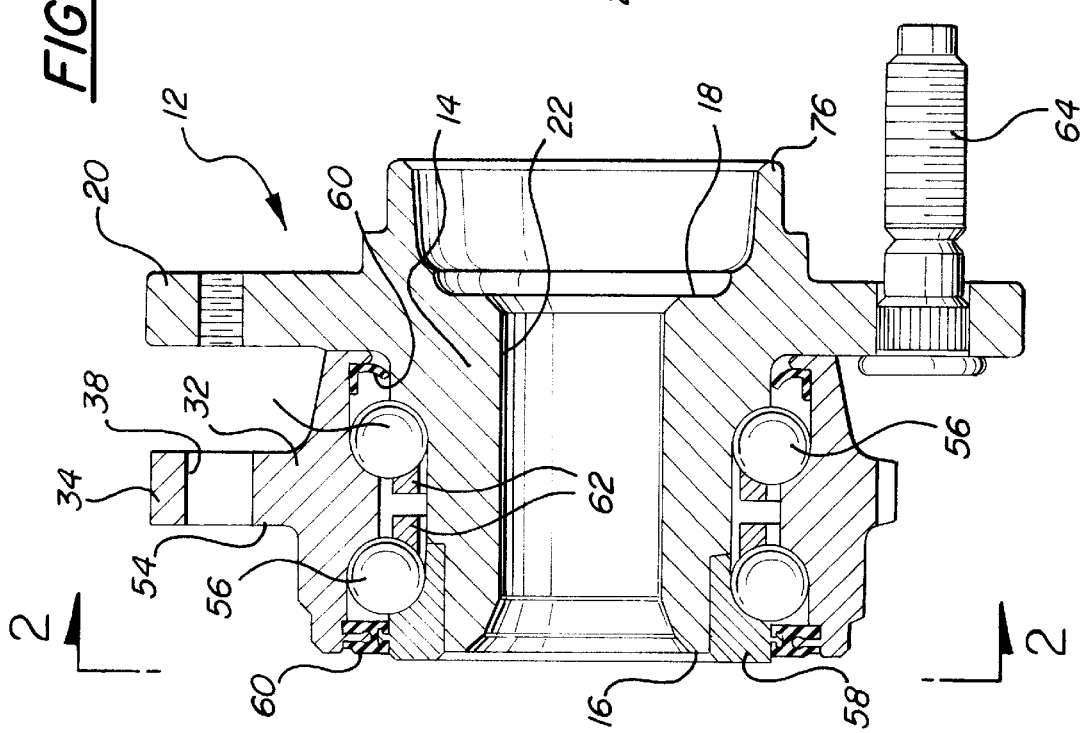

METHOD FOR FABRICATING BRAKE DISC

TECHNICAL FIELD

The subject invention relates to the disc brakes and, more specifically, to a method of fabricating the braking surfaces on the brake disc.

BACKGROUND OF THE INVENTION

With the advent of front wheel drive vehicles and disc brakes, the assembly which is driven by the drive shaft comprises a hub presenting a disc flange supporting a rotor having opposed braking surfaces and with a bearing assembly surrounding the hub with an outer race presenting a support flange for attachment to a king pin of a vehicle. When fully assembled on the vehicle, the braking surfaces of the disc rotor are disposed adjacent the brake pads of the brake disc assembly and separated from engaging the braking surfaces by a brake running clearance when the brake piston is not actuated. When the brake piston is actuated, the brake pads take up the clearance and engage the braking surfaces.

In order to provide this uniform running clearance, the disc rotor must be manufactured to close tolerances with the braking surfaces oriented radially or perpendicularly to the axis of rotation of the rotor when installed. A method of machining to close tolerances on a disc which is mounted through a bearing on a fixed stub shaft is disclosed in U.S. Pat. No. 5,430,926 issued Jul. 11, 1995 to D. J. Hartford. Normally, however, in a front drive or driven wheel, a bearing assembly is disposed about the hub, rather than in the hub as in the aforementioned patent, and after the braking surfaces have been machined. As the bearing assembly is mounted to the vehicle the bearing assembly is loaded to finalize the relationship or orientation between the braking surfaces and the axis of rotation and can result in misalignment of the braking surfaces. A method of machining a brake disc assembly which moves the art forward is disclosed in co-pending application Ser. No. 08/807,097 filed Feb. 27, 1997 in the names of Raymond C. Rapisardi and Vince J. Austin, pending now. However, perfections are yet to be made in this new method.

SUMMARY OF THE INVENTION AND ADVANTAGES

Accordingly, the subject invention provides a method for fabricating a brake disc assembly including a hub extending between a drive end and a wheel end and presenting a disc flange and having a bore extending between the ends for receiving a drive shaft, a brake disc having a base attached to the disc flange and a rotor extending radially from the hub and presenting parallel braking surfaces, a bearing assembly surrounding the hub between the drive end and the disc flange for supporting the hub with an outer race presenting a support flange for attachment to a support structure wherein the method comprising the steps of:

clamping the outer race of the bearing assembly in a fixed orientation about a fixed axis;

rotating the brake disc and the hub relative to the outer race about a rotation axis; and machining the braking surfaces of the rotor while rotating the hub and brake disc relative to the outer race;

with the method being characterized by frictionally engaging the base of the brake disc with a rotating member in a plane perpendicular to the rotation axis to allow for relative radial movement between the base of the brake disc and the rotating member to thereby allow for relative radial movement between the brake disc and the outer race.

By machining the braking surfaces while fixing the outer race of the bearing assembly, the braking surfaces are oriented relative to the center of the bearing axis of rotation so as to reduce disc run out and running clearances. In order to perfect this method, the rotation member is in frictional driving engagement to allow radial movement relative to the rotation member.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a cross sectional view of the hub and bearing assembly processed in accordance with the subject invention;

FIG. 2 is a view taken substantially along line 2—2 of FIG. 1;

DETAILED DESCRIPTION OF THE PREFERRED EMBODIMENT

Figure 5:
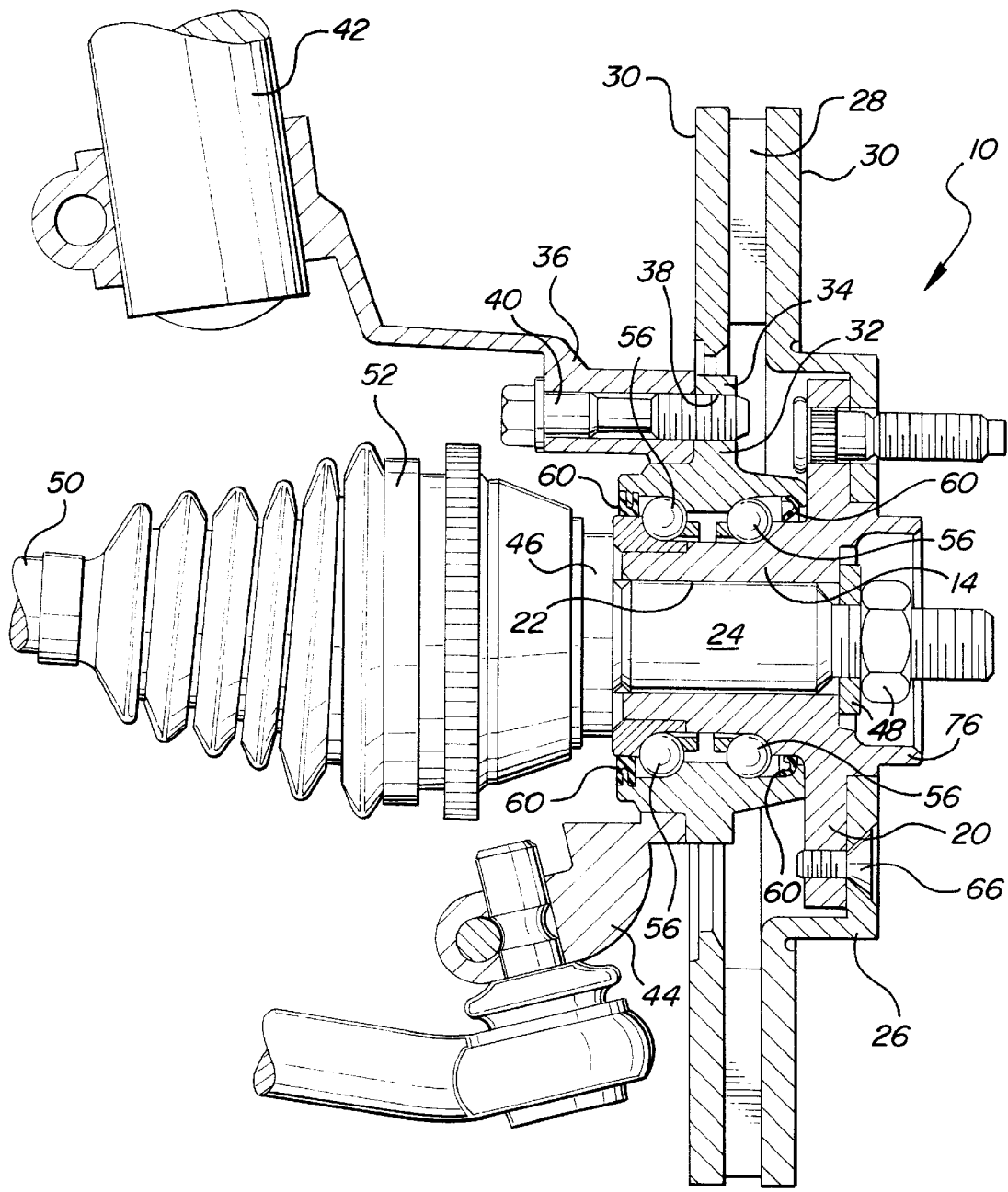
FIG. 5 is a cross sectional view of the completed assembly installed in a vehicle.
Figure 6:
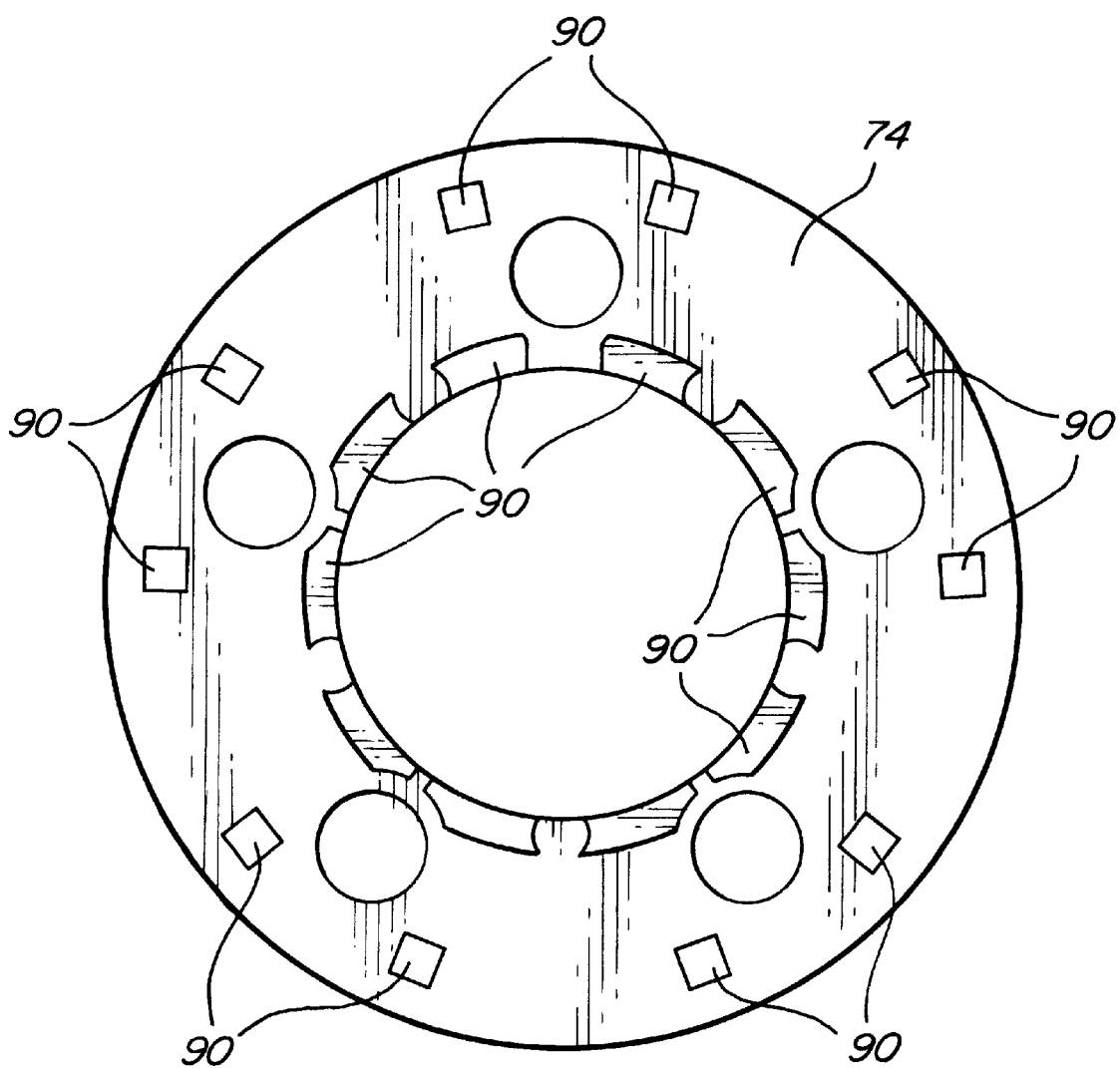
FIG. 6 is a cross sectional view taken along line 6—6 of FIG. 4.

Referring to the Figures, wherein like numerals indicate like or corresponding parts throughout the several views, a hub and brake disc assembly manufactured in accordance with the subject invention is generally shown at 10. The assembly 10 includes a hub and bearing subassembly as generally shown at 12 in FIG. 1. The subassembly 12 comprises a hub 14 extending between a drive end 16 and a wheel end 18. The hub 14 presents a disc flange 20 and has a bore 22 extending between the ends 16 and 18 for receiving a drive shaft 24, as shown in FIG. 5. The subassembly 12 also includes a brake disc having a base 26 attached to the disc flange 20 and a rotor 28 extending radially from the hub 14 and presenting parallel braking surfaces 30. A bearing assembly surrounds the hub 14 between the drive end 16 and the disc flange 20 for supporting the hub 14. To support the hub 14, the bearing assembly includes an outer race 32 presenting a support flange 34 for attachment to a support structure 36. The support flange 34 is generally triangular in peripheral configuration as best shown in FIG. 2. The support flange 34 includes holes 38 at the apexes for receiving bolts 40 which, in turn, attach to the knuckle defining the support structure 36. The knuckle 36 is rotatably supported by a strut 42. A ball joint 44 connects the knuckle to the car structure. The drive shaft 24 has a head 46 in engagement with the bearing assembly and a nut/washer 48 which places the shaft 24 in tension to load the bearing assembly and to rotate the hub 14, which drives a wheel. The driving force is delivered through a drive axle 50 and a universal coupling, i.e., a constant velocity joint, 52, all of which is well known in the art.

The method for fabricating a brake disc assembly in accordance with the subject invention comprises various steps which may be performed in numerous different sequences.

The first step is the machining of a radially extending gage surface 54 on the support flange 34 of the outer race 32. This is followed by disposing roller elements 56 and the outer race 32 of the bearing assembly around the hub 14 with the gage surface 54 facing the drive end 16 of the hub 14. A race lock member 58 is secured to the hub 14 by a press fit to retain the bearing assembly on the hub 14 under a predetermined pre-load. At the same time, seals 60 are positioned between each end of the bearing assembly and the hub 34 and race lock member 58. Separators or cages 62 are also disposed between the roller elements 56.

A plurality of wheel studs 64 are secured to the disc flange 20 to extend axially therefrom toward the wheel end 18 of the hub 14, the studs 64 being press fitted in holes in the disc flange 20. The studs 64 are threaded and are employed to attach a wheel to the assembly, as is well known in the art.

The next step is the attaching of the base 26 of the brake disc to the disc flange 20 with the wheel studs 64 extending through the base 26 of the brake disc. The base 26 is attached by screws 66.

The head 70 of a fixture post 72 has an annular shoulder 69 for engaging the race lock member 58. The fixture post 72 is supported vertically for receiving the hub 14. The hub 14 is placed on the post 72 with the head 70 of a fixture post 72 in engagement with the race lock member 58 as the post 72 is inserted through the bore 22 to extend from the wheel end 18 of the hub 14. The post 72 snugly engages the interior of the bore 22.

While in the vertical position, a pressure plate 74 is disposed about the wheel end 18 and in engagement with the base 26 of the brake disc. The pressure plate 74 has an opening surrounding a projection 76 at the wheel end 18. A plurality of bushings 75 are press fitted into the pressure plate 74 to surround, in spaced relationship, each of the studs 64. The bushings 75 are of brass, which is softer than the studs 64, to prevent damage to the threads of the studs 64.

A plurality of tabs 90 are disposed on the pressure plate 74 about each wheel stud 64. The tabs 90 engage the base 26 of the brake disc for simulating the pressure points exerted by a vehicle wheel. In this fashion, the brake disc is machined under conditions which are as near the running conditions of the brake disc when mounted on a vehicle with a vehicle wheel attached. A washer/nut 78 is disposed over the pressure plate 74 and in threaded engagement with the post 72 to place the post 72 in tension between the race lock member 58 and the pressure plate 74 to urge the tabs 90 into engagement with the base 26 of the brake disc for simulating the pressure points exerted by a vehicle wheel. This maintains the pre-load on and retains the bearing assembly to the hub 14; this prevents the race lock member 58 from changing position to maintain the pre-loading the same as occurs when the assembly is mounted on the vehicle as shown in FIG. 5. This also provides a clamp load between the rotor and the hub face.

Figure 3:
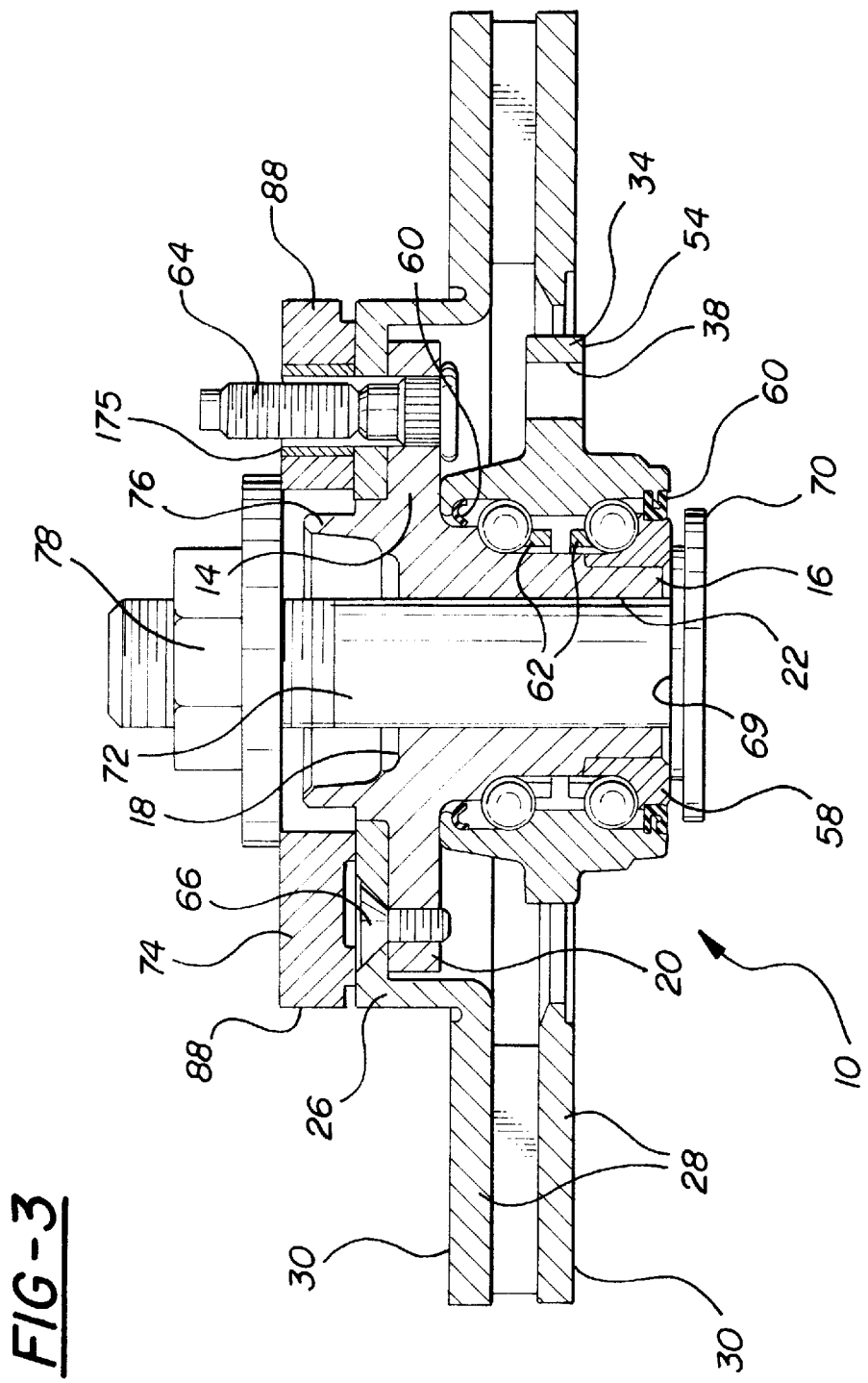
FIG. 3 is a cross sectional view of the brake disc assembly with the clamping fixture attached thereto.
Figure 4:
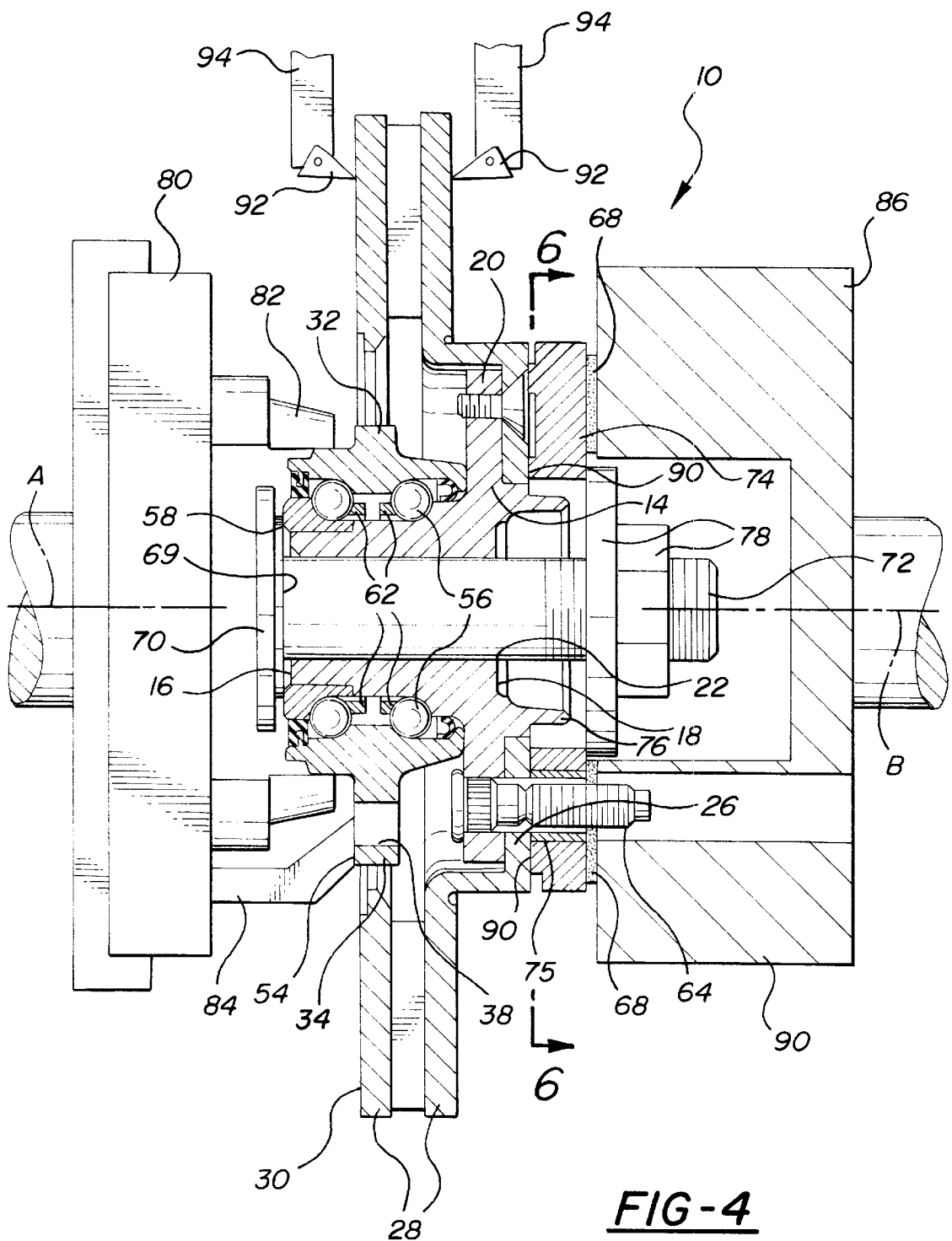
FIG. 4 is a cross sectional view of the assembly of FIG. 3 disposed in the machine for performing the machining of the disc braking surfaces.

This subassembly is then moved to a machining station, as shown in FIG. 4, and placed in position to be grasped by a cam chuck 80 mounted on a stationary machine. The cam chuck 80 has jaws 82 which clamp the outer race 32 of the bearing assembly and draws the gage surface 54 against a gage 84 to properly orient the outer race 32 about a fixed axis A. The gage 84 is shown as engaging only one area of the circumference of the gaging surface 54; however, the gage 84 engaging most of the circumference of the gaging surface 54 and includes air sensors to affirm that the gaging surface 54 is properly oriented and engaging the gage 84 in all quadrants.

Once the outer race 32 is clamped in a fixed position relative to the fixed axis A, the next step is engaging the pressure plate 74 with a rotating member 86 to rotate the rotating member 86 about a floating axis B. More specifically, a resilient pad 68 is sandwiched between the pressure plate 74 and the rotating member 86 in a plane perpendicular to the rotation axis B and urging the rotating member 86 against the pressure plate 74 to compress the resilient pad 68 between the rotating member 86 and the pressure plate 74. Accordingly, the rotation member 86 rotates about the axis B which is floating, i.e., not fixed, to allow some relative radial movement between the outer race 32 and the hub 14 or brake disc. The resilient pad 68 allows relative radial movement between the rotation member 86 and the pressure plate 74 as the rotation member 86 is urged or forced axially into engagement with the resilient pad 68.

The final step is the machining of the braking surfaces 30 of the rotor 28 while rotating the hub 14 and brake disc relative to the outer race 32. This machining is accomplished with cutting inserts 92 which are supported on shafts 94 on opposite sides 30 of the disc rotor 28.

Subsequently, the post 72 is removed and the assembly is installed onto the knuckle as shown in FIG. 5.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A method for fabricating a brake disc assembly including a hub (14) extending between a drive end (16) and a wheel end (18) and presenting a disc flange (20) and having a bore (22) extending between the ends for receiving a drive shaft, a brake disc having a base (26) attached to the disc flange (20) and a rotor (28) extending radially from the hub (14) and presenting parallel braking surfaces (30), a bearing assembly surrounding the hub (14) between the drive end (16) and the disc flange (20) for supporting the hub (14) with an outer race (32) presenting a support flange (34) for attachment to a support structure (36), said method comprising the steps of:

clamping the outer race (32) of the bearing assembly in a fixed orientation about a fixed axis (A);

rotating the brake disc and the hub (14) relative to the outer race (32) about a rotation axis (B); and machining the braking surfaces (30) of the rotor (28) while rotating the hub (14) and brake disc relative to the outer race (32);

said method characterized by frictionally engaging the hub (14) with a rotating member (86) in a plane perpendicular to the rotation axis (B) to allow for relative radial movement between the base (26) of the brake disc and the rotating member (86) to thereby allow for relative radial movement between the brake disc and the outer race (32).

2. A method as set forth in claim 1 including disposing roller elements (56) and the outer race (32) of the bearing assembly around the hub (14); securing a race lock member (58) to the hub (14) to retain the bearing assembly on the hub (14) and to pre-load the bearing assembly.

3. A method as set forth in claim 2 including maintaining the pre-loading on the bearing assembly while machining the braking surfaces (30) by applying a force to urge the race lock member (58) onto the hub (14).

4. A method as set forth in claim 3 further defined as maintaining the pre-loading on the bearing assembly by inserting a fixture post (72) through the bore (22) and placing the post (72) in tension between the race lock member (58) and the wheel end (18) of the hub (14).

5. A method as set forth in claim 4 further defined by disposing a pressure plate (74) about the wheel end (18) and in engagement with the base (26) of the brake disc; and placing the post (72) in tension between the pressure plate (74) and the bearing lock member (58) to urge the pressure plate (74) against the base (26) of the brake disc.

6. A method as set forth in claim 5 further defined as disposing tabs (90) on the pressure plate (74) and engaging the base (26) of the brake disc with the tabs (90) for simulating the pressure points exerted by a vehicle wheel.

7. A method as set forth in claim 5 further defined as disposing a resilient pad (68) disposed between the pressure plate (74) and the rotating member (86) for facilitating the relative radial movement between the base (26) of the brake disc and the rotating member (86).

8. A method as set forth in claim 1 including machining a radially extending gage surface (54) on the support flange (34) of the outer race (32); and drawing the gage surface (54) against a gage to properly orient the outer race (32) about a fixed axis while clamping the outer race (32) of the bearing assembly.

9. A brake disc assembly made in accordance with the method of claim 1.

10. A method for fabricating a brake disc assembly including a hub (14) extending between a drive end (16) and a wheel end (18) and presenting a disc flange (20) and having a bore (22) extending between the ends for receiving a drive shaft, a brake disc having a base (26) attached to the disc flange (20) and a rotor (28) extending radially from the hub (14) and presenting parallel braking surfaces (30), a bearing assembly surrounding the hub (14) between the drive end (16) and the disc flange (20) for supporting the hub (14) with an outer race (32) presenting a support flange (34) for attachment to a support structure (36), said method comprising the steps of:

clamping the outer race (32) of the bearing assembly in a fixed orientation about a fixed axis (A);

rotating the brake disc and the hub (14) relative to the outer race (32) about a rotation axis (B);

securing a pressure plate (74) to the hub (14); and machining the braking surfaces (30) of the rotor (28) while rotating the hub (14) and brake disc relative to the outer race (32) with a rotating member (86);

said method characterized by sandwiching a resilient pad (68) between the pressure plate (74) and the rotating member (86) in a plane perpendicular to the rotation axis (B) and urging the rotating member (86) against the pressure plate (74) to compress the resilient pad (68) between the rotating member (86) and the pressure plate (74).

11. A method as set forth in claim 10 further defined as disposing tabs (90) on the pressure plate (74) and engaging the base (26) of the brake disc with the tabs (90) for simulating the pressure points exerted by a vehicle wheel.

12. A brake disc assembly made in accordance with the method of claim 10.

13. A method for fabricating a brake disc assembly including a hub (14) extending between a drive end (16) and a wheel end (18) and presenting a disc flange (20) and having a bore (22) extending between the ends for receiving a drive shaft, a brake disc having a base (26) attached to the disc flange (20) and a rotor (28) extending radially from the hub (14) and presenting parallel braking surfaces (30), a bearing assembly surrounding the hub (14) between the drive end (16) and the disc flange (20) for supporting the hub (14) with an outer race (32) presenting a support flange (34) for attachment to a support structure (36), said method comprising the steps of:

machining a radially extending gage surface (54) on the support flange (34) of the outer race (32);

disposing roller elements (56) and the outer race (32) of the bearing assembly around the hub (14) with the gage surface (54) facing the drive end (16) of the hub (14);

securing a race lock member (58) to the hub (14) to retain the bearing assembly on the hub (14) and to pre-load the bearing assembly;

securing a plurality of wheel studs (64) to the disc flange (20) to extend axially therefrom toward the wheel end (18) of the hub (14);

attaching the base (26) of the brake disc to the disc flange (20) with the wheel studs (64) extending through the base (26) of the brake disc;

inserting a fixture post (72) through the bore (22) to extend from the wheel end (18) of the hub (14);

disposing a pressure plate (74) about the wheel end (18) with holes (75) in spaced surrounding relationship to the studs (64);

disposing a plurality of tabs (90) on the pressure plate (74) about each wheel stud (64) and engaging the base (26) of the brake disc with the tabs (90);

placing the post (72) in tension between the race lock member (58) and the pressure plate (74) to urge the tabs (90) into engagement with the base (26) of the brake disc for simulating the pressure points exerted by a vehicle wheel;

clamping the outer race (32) of the bearing assembly and drawing the gage surface (54) against a gaging surface to properly orient the outer race (32) about a fixed axis;

rotating the pressure plate (74) with a rotating member (86) rotating about a rotation axis (B), sandwiching a resilient pad (68) between the pressure plate (74) and the rotating member (86) in a plane perpendicular to the rotation axis (B) and urging the rotating member (86) against the pressure plate (74) to compress the resilient pad (68) between the rotating member (86) and the pressure plate (74); and machining the braking surfaces (30) of the rotor (28) while rotating the hub (14) and brake disc relative to the outer race (32) with the rotating member (86) in frictional engagement with the pressure plate (74) through the resilient pad (68) to minimize runout.

14. A brake disc assembly made in accordance with the method of claim 13.

* * * * *